US006967955B1

(12) United States Patent
Puntambekar et al.

(10) Patent No.: US 6,967,955 B1
(45) Date of Patent: Nov. 22, 2005

(54) VIRTUAL PATH MERGING IN A MULTIPOINT-TO-POINT NETWORK TUNNELING PROTOCOL

(75) Inventors: Arvind S. Puntambekar, Westford, MA (US); Sushil Shelly, Shrewsbury, MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/534,737

(22) Filed: Mar. 27, 2000

Related U.S. Application Data (63) Continuation of application No. 09/074,364, filed on May 7, 1998.

(60) Provisional application No. 60/059,245, filed on Sep. 18, 1997.

(51) Int. Cl.[7] .............................................. H04L 12/28
(52) U.S. Cl. ...................... 370/397; 370/409; 370/410
(58) Field of Search ........................... 370/395.1, 396, 370/397, 398, 395.2, 395.3, 395.5, 400, 410, 370/399, 395.21, 395.31, 395.32, 394.4, 370/409, 426, 429, 431, 380

(56) References Cited

U.S. PATENT DOCUMENTS

| 5,422,882 | A | * | 6/1995 | Hiller et al. ................. 370/399 |
| 5,479,401 | A | | 12/1995 | Bitz et al. ................... 370/60.1 |
| 5,546,387 | A | | 8/1996 | Larsson et al. ............... 370/60 |
| 5,548,589 | A | | 8/1996 | Jeon et al. ................... 370/60.1 |
| 5,568,475 | A | | 10/1996 | Doshi et al. ................. 370/58.2 |
| 5,570,361 | A | | 10/1996 | Norizuki et al. ............. 370/60.1 |
| 5,583,865 | A | | 12/1996 | Esaki et al. .................. 370/397 |
| 5,583,868 | A | | 12/1996 | Rashid et al. ................ 370/394 |
| 5,717,689 | A | | 2/1998 | Ayanoglu .................... 370/349 |
| 5,734,652 | A | | 3/1998 | Kwok ......................... 370/395 |
| 5,872,773 | A | | 2/1999 | Katzela et al. .............. 370/256 |
| 5,905,728 | A | * | 5/1999 | Han et al. ................. 370/395.3 |
| 5,933,412 | A | * | 8/1999 | Choudhury et al. ......... 370/397 |
| 6,009,100 | A | * | 12/1999 | Gausmann et al. .......... 370/397 |
| 6,052,374 | A | * | 4/2000 | Stephens .................... 370/428 |
| 6,108,708 | A | * | 8/2000 | Iwata ......................... 370/409 |
| 6,141,322 | A | * | 10/2000 | Poretsky ..................... 370/398 |
| 6,144,666 | A | * | 11/2000 | Chen et al. .............. 370/395.3 |
| 6,151,325 | A | * | 11/2000 | Hluchyj ...................... 370/398 |
| 6,185,209 | B1 | * | 2/2001 | Wicklund .............. 370/395.71 |
| 6,304,549 | B1 | * | 10/2001 | Srinivasan et al. .......... 370/468 |
| 6,345,051 | B1 | * | 2/2002 | Gupta et al. ........... 370/395.51 |

* cited by examiner

*Primary Examiner*—Andy Lee (57) ABSTRACT

A computer network includes frame- or packet-based subnetworks connected by switches, the switches being interconnected by high-capacity trunks using a connection-based data transfer protocol similar to Asynchronous Transfer Mode (ATM). Some of the trunks include a Permanent Virtual Path (PVP) trunk crossing an ATM core network, the PVP trunk including one or more bidirectional PVPs. A multipoint-to-point (MPT) protocol is used among the switches to transfer packets as groups of cells directly from "leaf", or source, switches to "root", or destination, switches without requiring significant routing-related processing during cell transmission. The switches allocate virtual path identifiers in a conserving manner such that (i) MPT paths from multiple leaf switches are merged to one path with a single virtual path identifier terminating at a root switch; (ii) on the PVP trunks, a virtual path identifier already allocated for an outgoing connection is allocated to an incoming connection ahead of any virtual path identifiers that are completely unallocated; and (iii) a range of virtual path identifiers is pre-provisioned at the core network access points, so that a switch connected to an access point allocates virtual path identifiers from the pre-provisioned range on behalf of upstream switches to extend MPTs across the core network.

6 Claims, 11 Drawing Sheets

VIRTUAL PATH MERGING IN A MULTIPOINT-TO-POINT NETWORK TUNNELING PROTOCOL

CROSS REFERENCE TO RELATED APPLICATIONS

This application is a continuation of patent application Ser. No. 09/074,364, now U.S. Pat. No. 6,097,726 filed May 7, 1998, which claims priority from provisional patent application Ser. No. 60/059,245, filed Sep. 18, 1997.

STATEMENT REGARDING FEDERALLY SPONSORED RESEARCH OR DEVELOPMENT

Not Applicable

BACKGROUND OF THE INVENTION

The present invention is related to the field of computer networks, and more particularly to networks including Asynchronous Transfer Mode (ATM) switches employing a connection-based multipoint-to-point tunneling protocol to transfer connectionless data traffic, such as data traffic carried by Internet Protocol (IP) packets.

Many computer networks employ connectionless protocols for transferring data among nodes. In a connectionless protocol, data is transferred as a series of one or more datagrams, each transmitted along a network segment when no higher-priority datagrams are being transmitted on the segment. A well-known example of such a connectionless protocol is the Internet Protocol (IP). IP datagrams, or packets, are forwarded by devices known as routers that determine the network segment on which the packet is to be forwarded based on a destination address included in the packet, and then forward the packet over the respective network segment.

Connectionless protocols differ from connection-oriented protocols, in which data traffic is sent over pre-established connections between sending and receiving nodes, much like a telephone call. For example, datagrams may become lost or suffer extensive delay in an error-prone or congested network. One source of delay is the need to dynamically determine and implement the routing of the datagram. In a connection-oriented network, traffic is routed along a previously established and allocated route, and thus routing in a connection-oriented network is generally simpler to implement and enables higher-speed packet forwarding.

Connection-oriented data protocols more closely resemble protocols used in standard audio telephony, and also better support streaming transmissions such as digital video. Thus as the need for transmission of voice, video, and data over a common network has increased, there has been a trend toward increasing use of connection-oriented protocols. Asynchronous Transfer Mode (ATM) is one example of a connection-oriented protocol that is receiving increased use. In fact, the use of ATM switches within the core of the public data communications network has become more common, and thus the ATM protocol has become an important industry-standard protocol.

Connection-oriented networks like ATM networks employ switches rather than routers to route traffic. Connections through a switch are established prior to the beginning of data transmission; the connections correspond to a path through multiple switch elements linking source and destination nodes. Once a path is established, it remains in place until specifically torn down, regardless of whether data traffic is being transmitted at any given time. Some connections may be long-lived; in fact, there is in some networks a notion of a "permanent" path that might be dedicated, for example, to carrying large volumes of traffic between specified sites.

Connection-oriented networks must use some means for identifying connections over which data is to be forwarded. ATM employs a 2-tier switching technique that uses two separate connection identifiers. An ATM data cell includes an 8-bit Virtual Path Identifier (VPI) as well as a 16-bit Virtual Channel Identifier (VCI). This technique allows network elements such as switches to make switching decisions based on either the VPI or the VCI. Although other arrangements are possible, networks commonly employ "VPI switching", in which VCIs identify an individual connection between a source and a destination over a trunk-like path carrying numerous connections, and the VPIs are used to identify virtual paths within the network. Many virtual paths may be employed at a given physical port of a network element such as a switch.

In a large network that includes an ATM core network, the 8-bit limitation on VPI space (i.e., 256 paths) requires that the space be well managed to maximize the number of usable paths. For example, a large network could not afford to reserve some VPI bits for a separate signalling function, allocating only the remaining bits for virtual path identification, because such an allocation would result in too few allocatable virtual paths. Thus there is a general need to manage relatively small connection identifier spaces like the VPI space in a network using the ATM protocol.

Prior switches have used a connection-oriented protocol like ATM on inter-switch trunks that carry high-volume inter-switch data traffic. At one end of such a trunk, a switch concentrates data traffic originating at multiple input ports onto the trunk, while at the other end a switch de-multiplexes the traffic for distribution to its output ports. The switches have had interfaces to cell-based subnetworks like ATM, and also interfaces to frame- or packet-based subnetworks, an example of a packet subnetwork being the Internet Protocol (IP) network mentioned above. Thus the switches have been designed to forward both connection-oriented and connectionless data traffic over the connection-oriented inter-switch trunks.

The flow of connectionless data traffic in the connection-oriented inter-switch subnetwork is known as "tunneling". Cells arriving at an intermediate switch along an inter-switch path are simply switched from one incoming virtual path to a corresponding outgoing virtual path, the correspondence having been previously established by a separate connection-establishment procedure. This operation contrasts with operation in a set of interconnected routers, in which each router is required to examine an address or other routing-related information in an arriving a packet, determine the next hop for the packet, and then transmit the packet over the next hop. Switches employing tunneling also retain router-like functionality, because such functionality is needed to establish virtual paths at connection-establishment time. However, the routing function is normally bypassed at data-transmission time.

One particular tunneling technique is known as multipoint-to-point tunneling, or MPT. Each switch in an MPT environment is the "root" of a set of converging paths emanating from the other switches, known as "leafs". When a switch receives a datagram at a port, it determines which switch is connected to the subnetwork containing the destination node, and then forwards the datagram as a group of cells on the MPT path for which the destination switch is the root. Intermediate switches simply switch the cells from an incoming port to an outgoing port in accordance with the previously-established MPT path definition. The destination switch accumulates the cells, reconstructs the datagram, determines which output port the subnetwork containing the destination node is connected to, and sends the datagram over that port.

BRIEF SUMMARY OF THE INVENTION

In accordance with the present invention, a network of switches is disclosed in which the switches send connectionless data traffic such as IP packets between subnetworks via a connection-based network protocol, and do so in a fashion that makes efficient use of network connection identifiers.

In the disclosed network operating method, multipoint-to-point (MPT) traffic destined for a switch is merged to a single virtual path and thus uses only one VPI, even if the traffic may originate in any of a number of source switches. When a connection to a target switch over a trunk is being established, the root switch first determines whether a connection to any switches reachable via the trunk already exists. If not, the switch allocates a previously-unallocated VPI to be used with the new connection. The switch then signals the VPI to be used for the new connection to the target switch. The signaled VPI is the VPI of the existing connection, if any, and the allocated VPI otherwise. Thus where possible MPT data traffic from multiple leaf switches is merged to one virtual path, resulting in the allocation of fewer VPIs in the network than would otherwise occur.

In another technique used with the above-described merging technique, a range of VPIs is allocated at trunks connected to the ATM core network. A switch connected to the trunk allocates these VPIs only for MPT connections to itself or to upstream switches, that is, switches that can reach the core network only through the VPI-allocating switch. This technique ensures that upstream switches are able to establish MPTs on the core network despite the limited VPI space.

Other aspects, features, and advantages of the present invention are disclosed in the detailed description which follows.

DETAILED DESCRIPTION OF THE INVENTION

Figure 1:
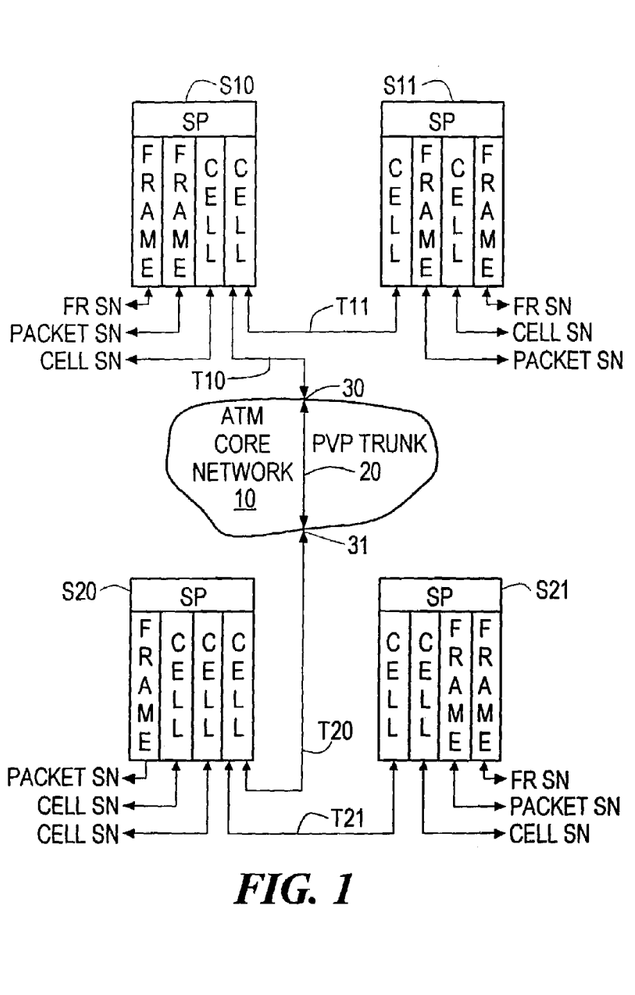
FIG. 1 is a block diagram of a network embodying the principles of the present invention.

FIG. 1 shows a network in which four network switches S10, S11, S20, and S21 are interconnected by trunks T10, T11, T20, and T21. Each switch contains a switch processor SP and various interface cards. Each interface card is connected to a different subnetwork, and different card types are used for connections to different types of subnetworks. Switch S10, for example, includes two Frame cards and two Cell cards. One Frame card is attached to Frame Relay subnetwork (FR SN), the other to a packet-based subnetwork (PACKET SN) such as an Internet Protocol (IP) subnetwork. One of the Cell cards is connected to a cell-based subnetwork (CELL SN) such as Asynchronous Transfer Mode (ATM). The other switches in FIG. 1 are shown with similar configurations. Network nodes attached to subnetworks connected to a common switch communicate with each other via local connections made between interface cards in the switch; nodes attached to subnetworks connected to different switches communicate with each other via connections made in each switch creating a path between the subnetworks over the trunk or trunks interconnecting the end switches.

The connection between switches S10 and S11 over trunk T11 is a direct connection, as is the connection between switches S20 and S21 over trunk T21. The connection between switches S10 and S20, however, is through an ATM core network 10. This connection includes three sub-connections, shown in FIG. 1 as trunk T10, trunk T20, and Permanent Virtual Path (PVP) Trunk 20. Trunk T10 connects switch S10 to one end of the PVP Trunk 20 at a first core network access point 30, and trunk T20 connects switch S20 to the other end of the PVP Trunk at a second core network access point 31. The access points 30, 31 are for example user ports of ATM switches used in the core network 10. The PVP Trunk 20 forms a connection through the ATM core network 10 between the two network access points 30 and 31, thus completing the connection between switches S10 and S20.

The PVP Trunk 20 is a set of one or more PVPs that have been administratively pre-provisioned by a network manager for MPT use by the switches S10, S11, S20, and S21. The PVPs are identified at each access point by a corresponding range of VPIs, as described in greater detail below. The size of the range of VPIs at either access point is the same; however, the starting point of the range in general is different. For example, the PVPs may be identified by VPIs 10–19 at access point 30, and by VPIs 20–29 at access point 31. The switches S10 and S11 are informed of the starting and ending VPIs that bracket the range of VPIs that designate a PVP when the network is initialized, prior to the establishment of a connection through the core network 10.

The core network 10 performs the bookkeeping required to switch those cells arriving at access point 31, having one VPI, toward access point 30, and also to replace the VPI with the corresponding VPI identifying the connection at access point 30 when the cells exit the core network. The core network 10 generally contains numerous other connections among other pairs of access points (not shown in FIG. 1). Some of these may also be pre-provisioned PVP Trunks for use by other switches (not shown) operating in the manner disclosed herein; others however are created and terminated on demand in the usual fashion for an ATM network.

The connections to a Cell card carry network traffic in fixed-length data units known as "cells", such as ATM cells. The connections to a Frame card carry network traffic in variable-length data units called "frames". The term "frame" as used herein includes what is commonly known as a packet. Thus the frame cards provide an interface to, among other things, Internet Protocol (IP) routers exchanging data and messages using IP packets.

Figure 2:
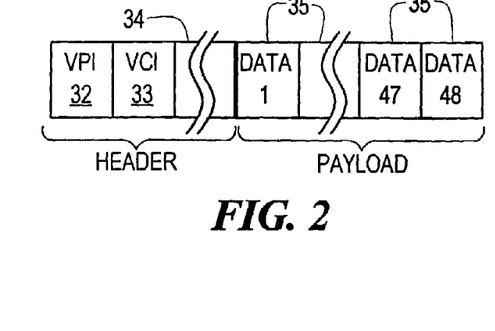
FIG. 2 is a schematic diagram of a data cell used in the network of FIG. 1.

FIG. 2 shows the general structure of an ATM cell. It includes a 5-byte header and a 48-byte payload. The header includes the 8-bit VPI 32, the 16-bit VCI 33, and other header fields 34. The payload is shown as a series of data bytes 35. The VPI field 32 and the VCI field 33 together uniquely identify a connection. In the system of FIG. 1, the switches S10, S11, S20 and S21 and the core network 10 employ the VPI switching, so that switching decisions are made based on the VPI field 32 and not the VCI field 33. The VCI field 33 conveys information between source and destination switches and thus is not disturbed by either the core network 10 or any switches acting as intermediate or relay switches.

Figure 3:
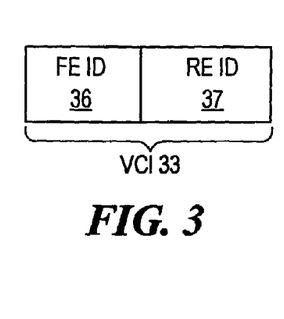
FIG. 3 is a schematic diagram of a. Virtual Channel Identifier (VCI) field that is part of the data cell of FIG. 2.

FIG. 3 shows the structure of the VCI field 33 as used in the system of FIG. 1. The VCI field 33 includes a 5-bit Forwarding Engine Identifier (FE ID) field 36 and an 11-bit Reassembly Identifier (RE ID) field 37. The use of these fields is described in greater detail below.

MPT Setup

A method by which MPTs are established is described below. The method includes functionality in a routing program used in the network of FIG. 1 known as Open Shortest Path First (OSPF). OSPF is responsible for knowing whether and how network elements are connected together, including the switches and subnets shown in FIG. 1. This functionality is largely conventional, and thus is not described herein. Extensions to OSPF needed to support the disclosed method are noted where appropriate.

Figure 4:
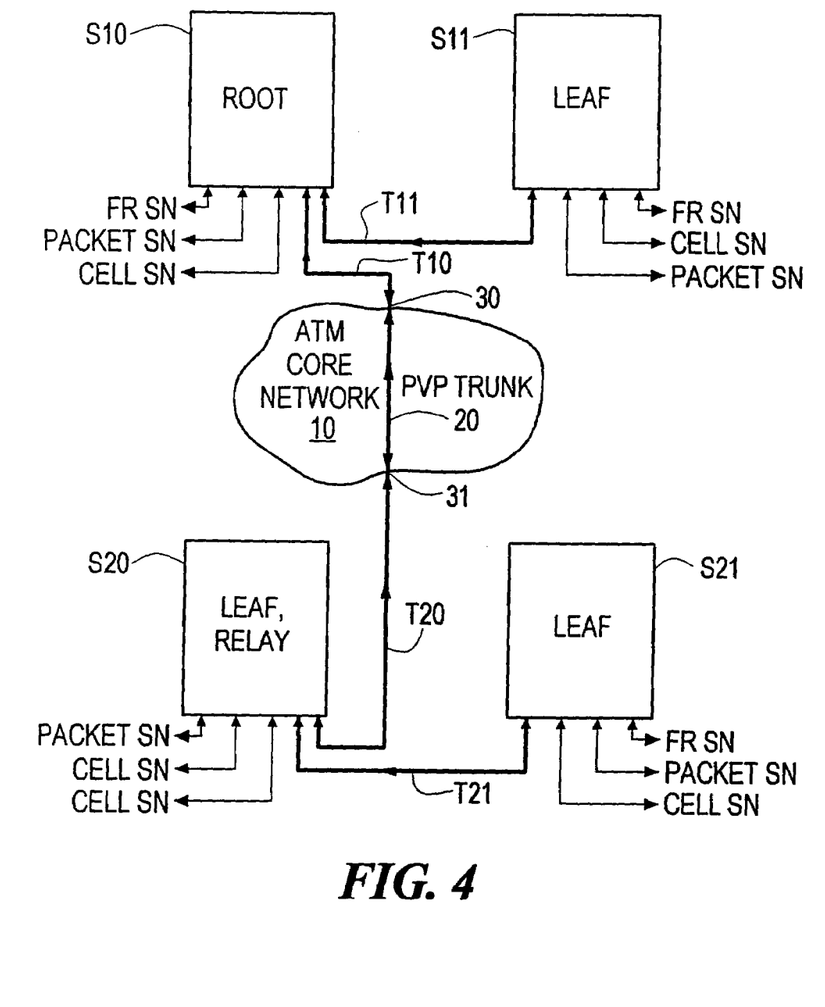
FIG. 4 is a block diagram of the network of FIG. 1 showing relationships among the switches for a first multipoint-to-point tunnel (MPT) established therein.

FIG. 4 shows a first MPT, hereinafter referred to as MPT(1), via which switch S10 receives data from the other switches S1, S20 and S21. MPT(1) includes a set of unidirectional virtual path on each of the trunks T11, T10, T20 and T21, as well as on the PVP Trunk 20. These paths are indicated by the arrowheads on the trunks in FIG. 4. For MPT(1), switch S10 is a "root" switch, and the other three switches are "leaf" switches. Switch S20 is also referred to as a "relay" switch because it performs the function of relaying cells from leaf switch S21 toward root switch S10. MPT(1) is established by switch S10 using MPT signalling in a manner described below.

In the following description, the terms "upstream" and "downstream" are used to denote direction in an MPT as follows: "upstream" means "toward the root switch", and "downstream" means "away from the root switch". Also, the terms "ingress" and "egress" are used to refer to the Cell cards at either end of a trunk with respect to a particular MPT. "Egress" means the Cell card that sends data cells upstream on the trunk, and "ingress" means the Cell card that receives data cells sent by an egress Cell card. Note that this definition refers only to the direction of DATA flow for a particular MPT. The direction of signalling is irrelevant, as is the fact that a Cell card of one type with respect to a given MPT can also be a Cell card of the other type with respect to another MPT.

The switches of FIG. 1 use a data structure known as the VC Entry Data Structure in conjunction with the method disclosed herein. This data structure is a large collection of virtual channel entries (VC Entries). Each VC Entry includes one or more fields that identifies the entry as a certain type, depending on the functions for which the VC Entry is used. The types are introduced and described in more detail below. In the illustrated embodiment, there are 2048 VC Entries allocated for use by MPT. Other VC Entries not discussed herein may be used for other purposes in the switches of FIG. 1.

The following types of VC Entries are used:

| Ref | Name | Location |
|-----|------|----------|
| R | Root | SP of root switch |
| D | Default Conn. | Cell & Frame cards of root switch |
| V | VP Termination | Trunk port of root switch |
| L | Leaf | SP of leaf switch |
| P | Parent | Upstream trunk port on leaf switch |
| C | Child | Downstream trunk port on leaf switch |
| F | FE Array | SP of leaf switch |
| RI | Reassembly Identifier | Frame card of root switch |

In addition to the VC Entry Data Structure, another data structure called "INCircuit" is used. This structure is shown in the Figures as IN; it is used on the Frame cards of leaf switches. Each INCircuit has an array of 32 connection identifiers associated with it, used to map a VPI/VCI pair to an internal path through the switching fabric within a switch.

The method by which switch S10 establishes MPT(1) is now described in conjunction with FIGS. 4 through 8. It is assumed that switch S10 connects to switches S11, S20, and S21 in that order. First, switch S10 determines whether there is an existing MPT to switch S11. The MPT system keeps track of MPTs as they are created, and thus is aware at any given time whether an MPT to a given switch exists. In this case, it is assumed that no prior MPT exists. Thus the SP in switch S10 allocates a Root VC Entry R, and then allocates an 11-bit Reassembly Identifier (RE ID). The Root VC Entry R signifies the termination point for cells being transmitted on the MPT being created. The RE ID is stored by each Frame card in switch S10 for later use, and is also included in a Call message created by switch S10 to be addressed and sent to switch S11.

Figure 5:
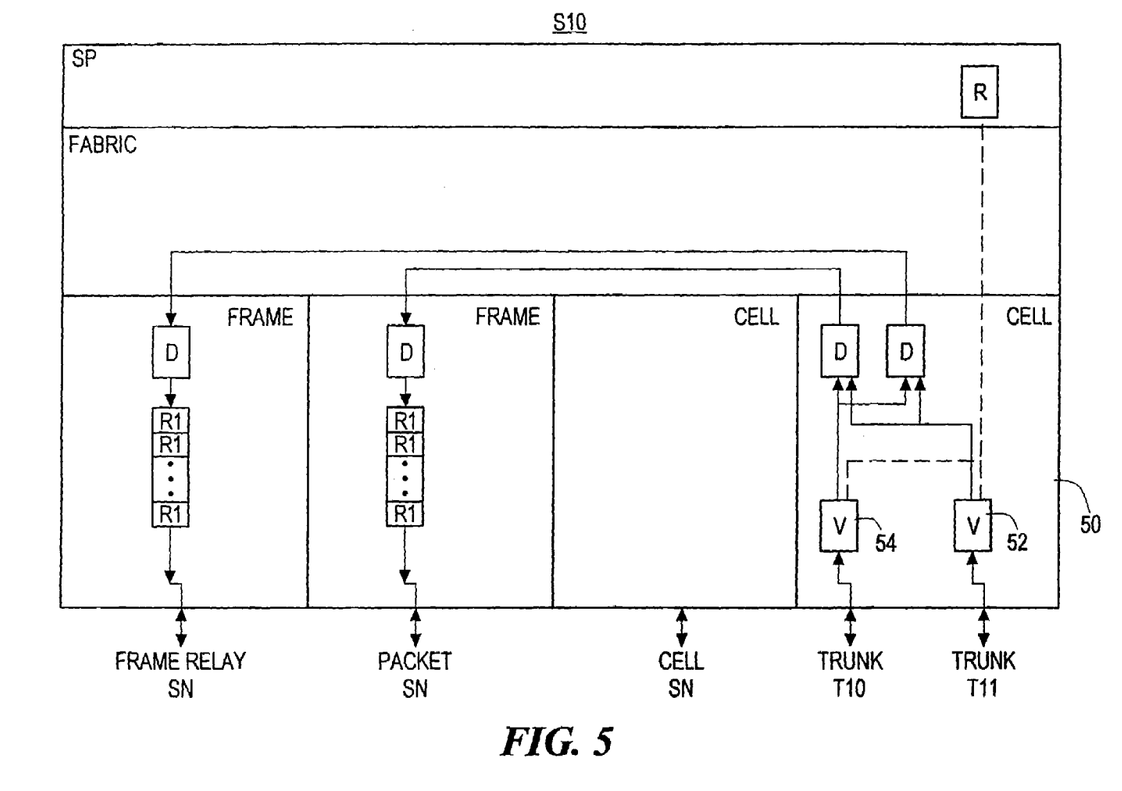
FIGS. 5 through 8 are schematic diagrams depicting various data structures and their relationships in the switches of FIG. 1 after the first MPT is established.

The ingress Cell card 50 on switch S10 allocates a first VP Termination VC Entry (V) 52, which has associated therewith a VPI reserved for use by MPT. This VPI is to be included in the VPI field 32 of all data cells sent to switch S10 by switch S11 to identify MPT(1). The ingress Cell card 50 inserts this VPI into the Call message as a data field and sends the message to switch S11 over trunk T11. The Call message is sent as a group of cells each using a pre-established value in the VPI field 32 that is reserved for signalling.

Figure 6:
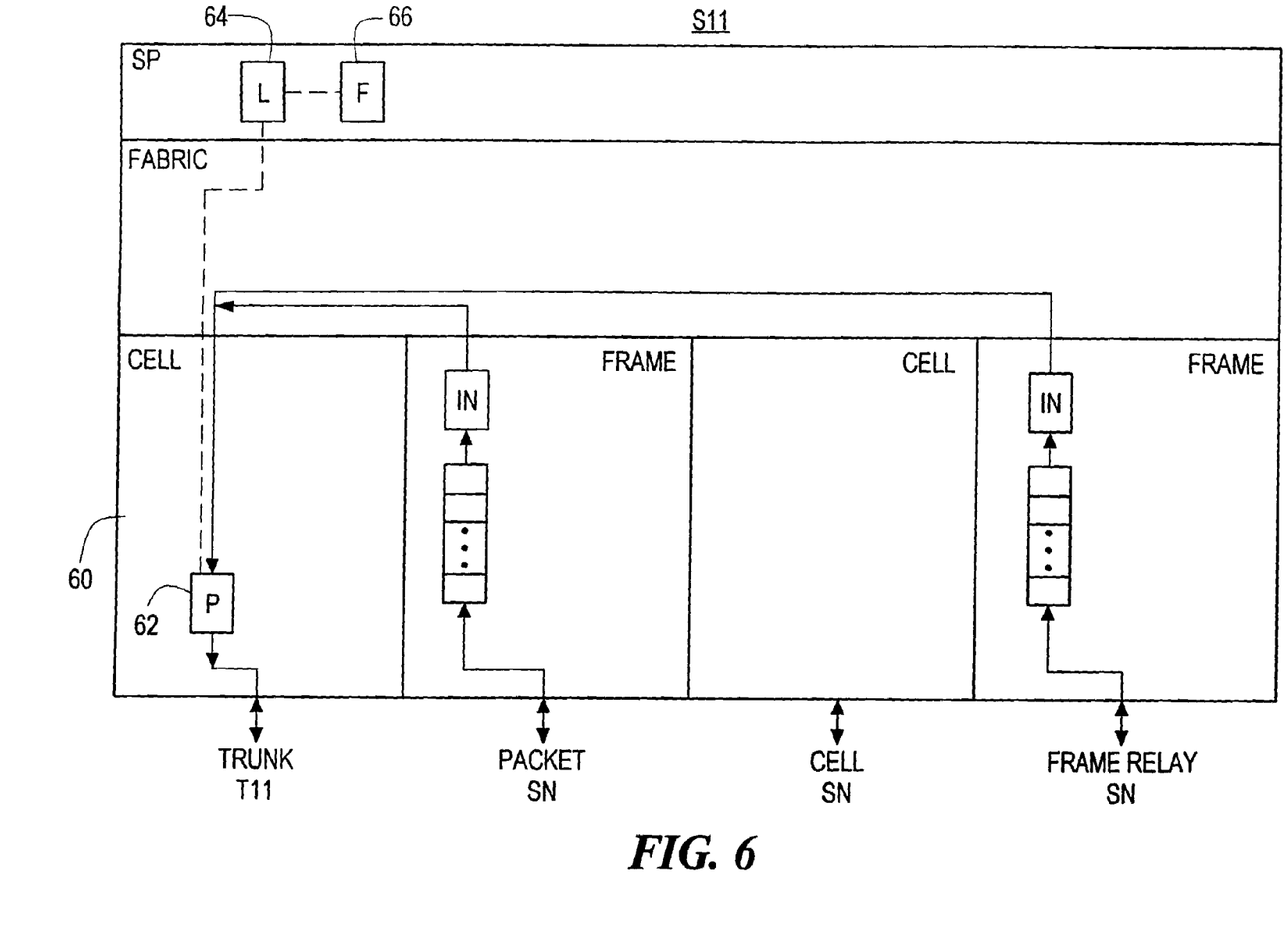

The egress Cell card 60 on switch S11 recognizes the signalling VPI and re-assembles the message. Recognizing the message as the first Call received at the port for trunk T11, the egress Cell card creates a Parent VC Entry (P) 52 which is used to handle subsequent MPT data traffic. The Cell card also determines that the target of the Call message is switch S11, and thus passes the Call on to the SP. The SP allocates a Leaf VC Entry (L) 64 having an FE Array VC Entry (F) 66 associated with it. The FE Array VC Entry 66 identifies "forwarding engines" (FEs) residing on the leaf switch (not shown in the Figures). An FE is an independent controller on a frame card that is responsible for the frame-to-MPT interface. On an egress switch, an FE handles frame-to-cell conversion and initiating the sending of cells on an MPT; on an ingress switch, an FE receives cells from an MPT, and handles cell-to-frame conversion and delivery of frames to the correct subnetwork. In one embodiment, there may be up to sixteen Frame cards in a switch, and up to two FEs on a Frame card. Thus the 5 bits in the FE ID field 36 uniquely identify one of a possible 32 FEs at the destination switch.

At the same time that the Leaf VC Entry 64 is allocated, the routing program OSPF is informed that the leaf switch is being added as a leaf of an MPT. OSPF stores the information associating destination routing addresses with the MPT, for use in a manner described below.

Having established itself as a leaf switch on MPT(1), switch S11 returns a CONFIRM message to switch S10 indicating that the MPT(1) connection has been established, and including a bit map indicating which FEs exist at the leaf switch S11. The root switch S10 responds by issuing a Call message to each FE on switch S11, each one including a different RE ID allocated by the SP in S10. The Parent VC Entry 62 on switch S11 forwards the Calls to the Frame cards, each of which responds by allocating an InCircuit structure IN in which the RE ID accompanying the Call is stored, and then returning a CONFIRM message. Once the root switch S10 has connected to each FE on switch S11, switch S11 is fully established as a leaf switch on MPT(1).

Having thus connected to leaf switch S11, root switch S10 proceeds to connect to switch S20. This process differs slightly from the above-described process for connecting to switch S11, because switches S10 and S20 are connected via the ATM core network 10. Again in this case there is no existing MPT to switch S10. The SP is aware through configuration information that trunk T10 is a PVP trunk. Thus the VP Termination VC Entry (V) 54 allocated for the connection to switch S20 is one associated with one of the pre-provisioned VPIs identifying a PVP on the PVP trunk 20 at access point 30. The Call message sent by switch S10 signals this VPI by sending an index value having a known relationship to the allocated VPI. This index value is referred to as the VPCI, for Virtual Path Connection Index. The VPCI is used because as described above switch S20 in general uses a different VPI to identify a PVP than does switch S10. What is important is that both switches understand which particular PVP within the PVP trunk 20 is allocated for MPT(1); the use of the VPCI enables such understanding. One straightforward technique for arriving at the VPCI is calculating the difference between the allocated VPI and the starting VPI in the range pre-provisioned for the PVP Trunk at access point 30.

Upon receiving the Call message, switch S20 (FIG. 7) determines the VPI to be used for MPT(1) from the received VPCI. Switch S20 knows to do this because it is aware through configuration information that trunk T20 is a PVP trunk. If the VPI signalling technique is as described above wherein the VPCI is a difference value, switch S20 adds the received VPCI to the starting VPI in the range pre-provisioned for the PVP Trunk at access point 31 to obtain the VPI to be allocated.

Figure 7:
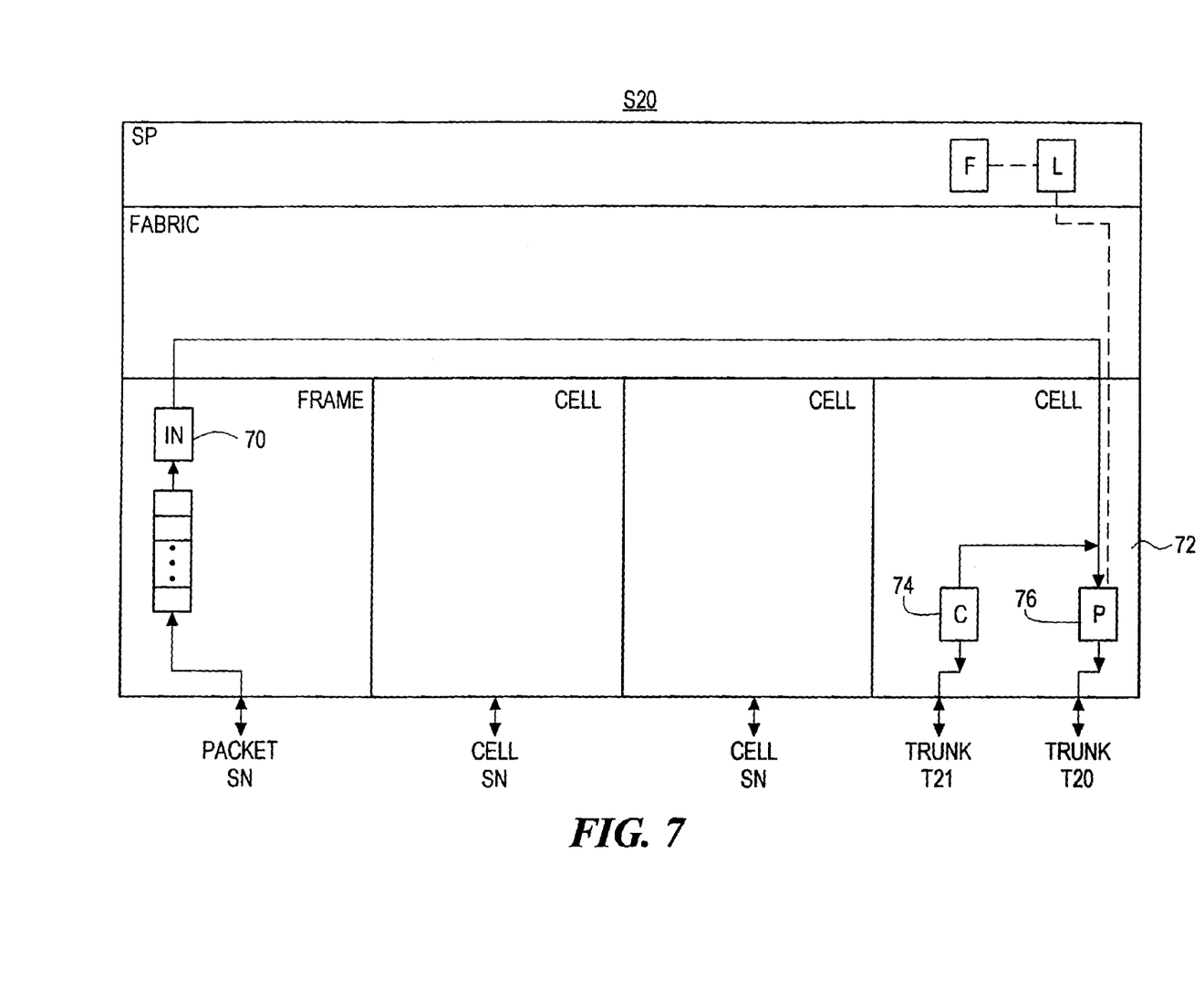

An example is presented assuming that VPIs 10–19 have been pre-provisioned at access point 30, and VPIs 20–29 have been pre-provisioned at access point 31. Assuming that switch S10 allocates VPI 10, it therefore sends a VPCI of 0 to switch S20, indicating that switch S20 should allocate the 0th VPI after the starting VPI (i.e., the starting VPI) in the range pre-provisioned at access point 31. Switch S20 thus allocates VPI 20 to MPT(1).

Once the two switches S10 and S20 know which PVP to use on the PVP trunk 20, the remainder of the processing for establishing S20 and its FEs as leafs on MPT(1) is the same as discussed above for switch S11. In the case of switch S20, only one InCircuit structure (IN) 70 is created, because the switch has only one Frame card.

Figure 8:
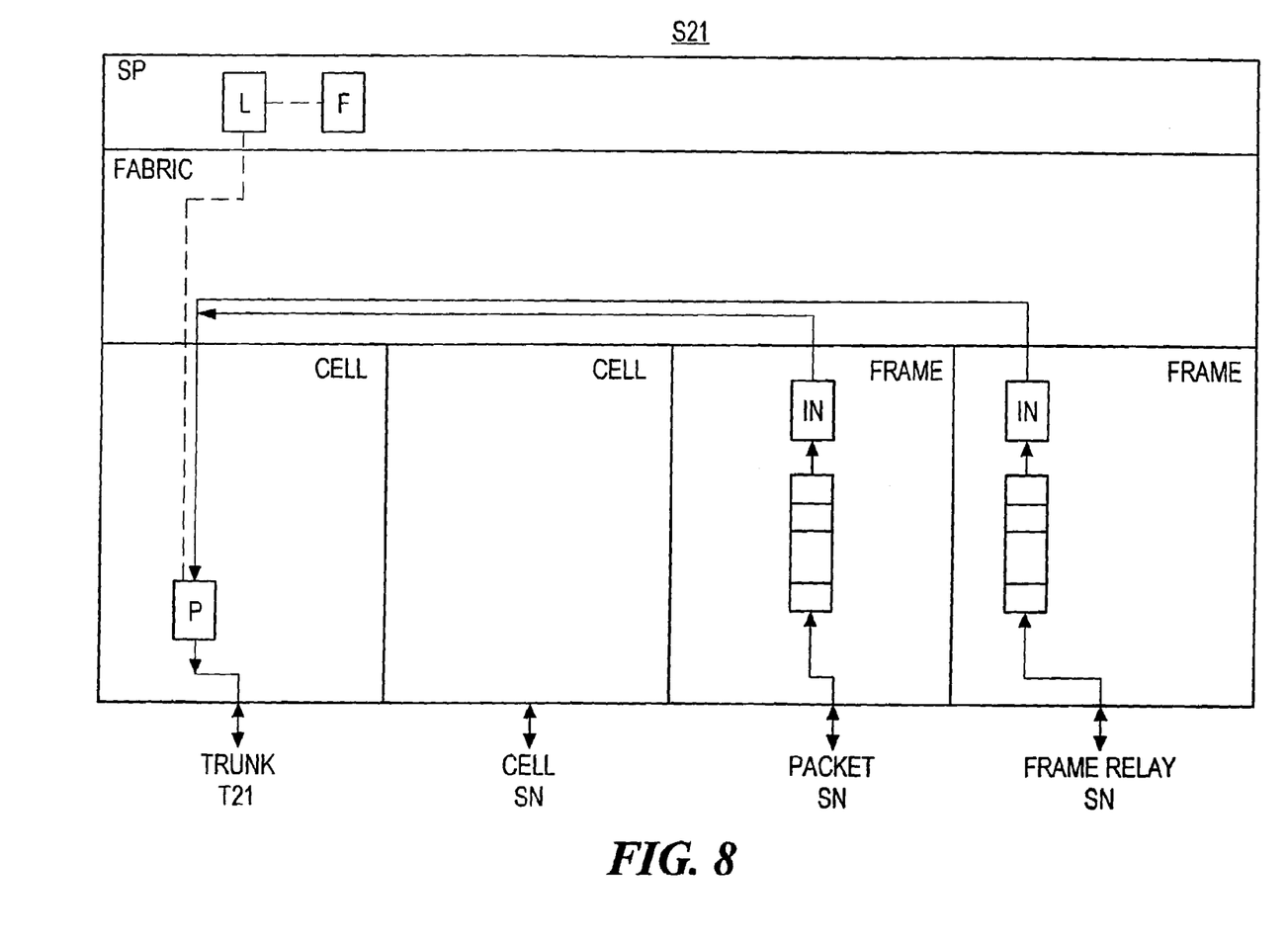

Switch S10 then proceeds to add switch S21 to MPT(1) In this case, MPT(1) already exists to switch S20. Therefore, a new MPT is not created; rather, the existing one is extended as follows: Switch S10 allocates a new RE ID and includes it in a Call message addressed to switch S21 including the same VPCI as used when calling S20. The egress Cell card 72 on switch S20 realizes that the Call is to be forwarded over trunk T21. The SP on switch S20 determines whether an MPT to switch S21 exists. In this case, no MPT exists yet, so the ingress Cell card 72 on switch S20 allocates a Child VC Entry (C) 74 associated with the existing Parent VC Entry (P) 76 and also with a VPI to be used on trunk T21. The ingress Cell card 72 modifies the Call message to signal the VPI associated with the Child VC Entry 72, and then forwards the Call message to switch S21 using the signalling VPI. In this manner switch S20 acts as an intermediate or relay switch between switches S10 and S21 for MPT(1).

From this point the signalling between switch S10 and switch S21 is the same as that between switch S10 and the other two switches S1 and S20, with the Parent-Child connection in the Cell card 72 on switch S20 providing the necessary bridge between trunks T21 and T20, and with no further allocation of VPIs by the Cell card 72 in switch S20. The VPI used for MPT(1) on trunk T21 may be different from the VPI used on trunk T20; thus the ingress Cell card 72 on switch S20 is responsible for maintaining the necessary mapping between these two VPIs.

Figure 9:
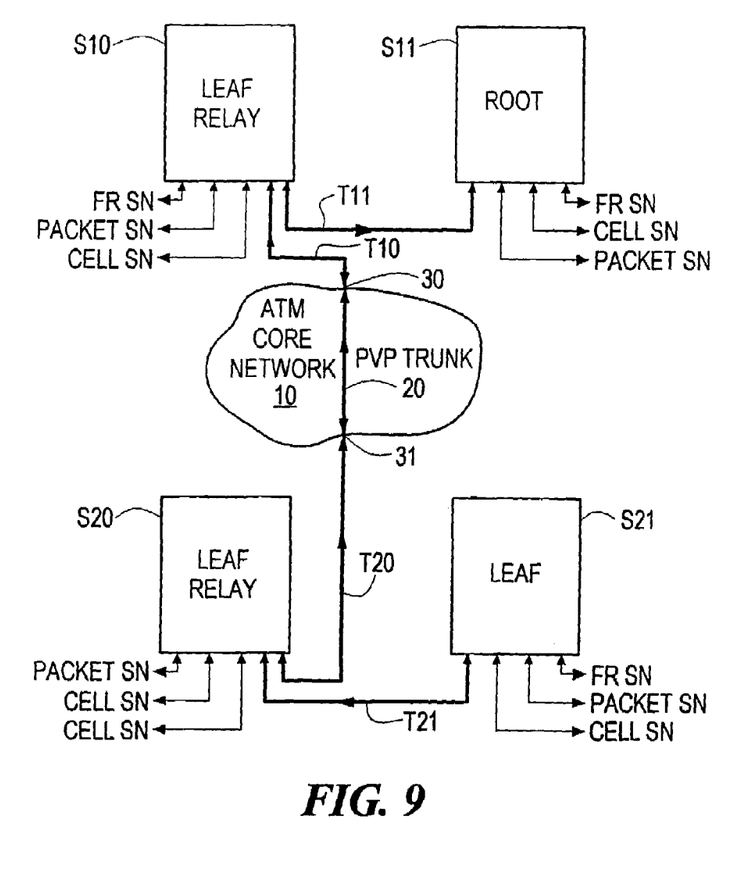
FIG. 9 is a block diagram of the network of FIG. 1 showing relationships among the switches for a second MPT established therein.
Figure 10:
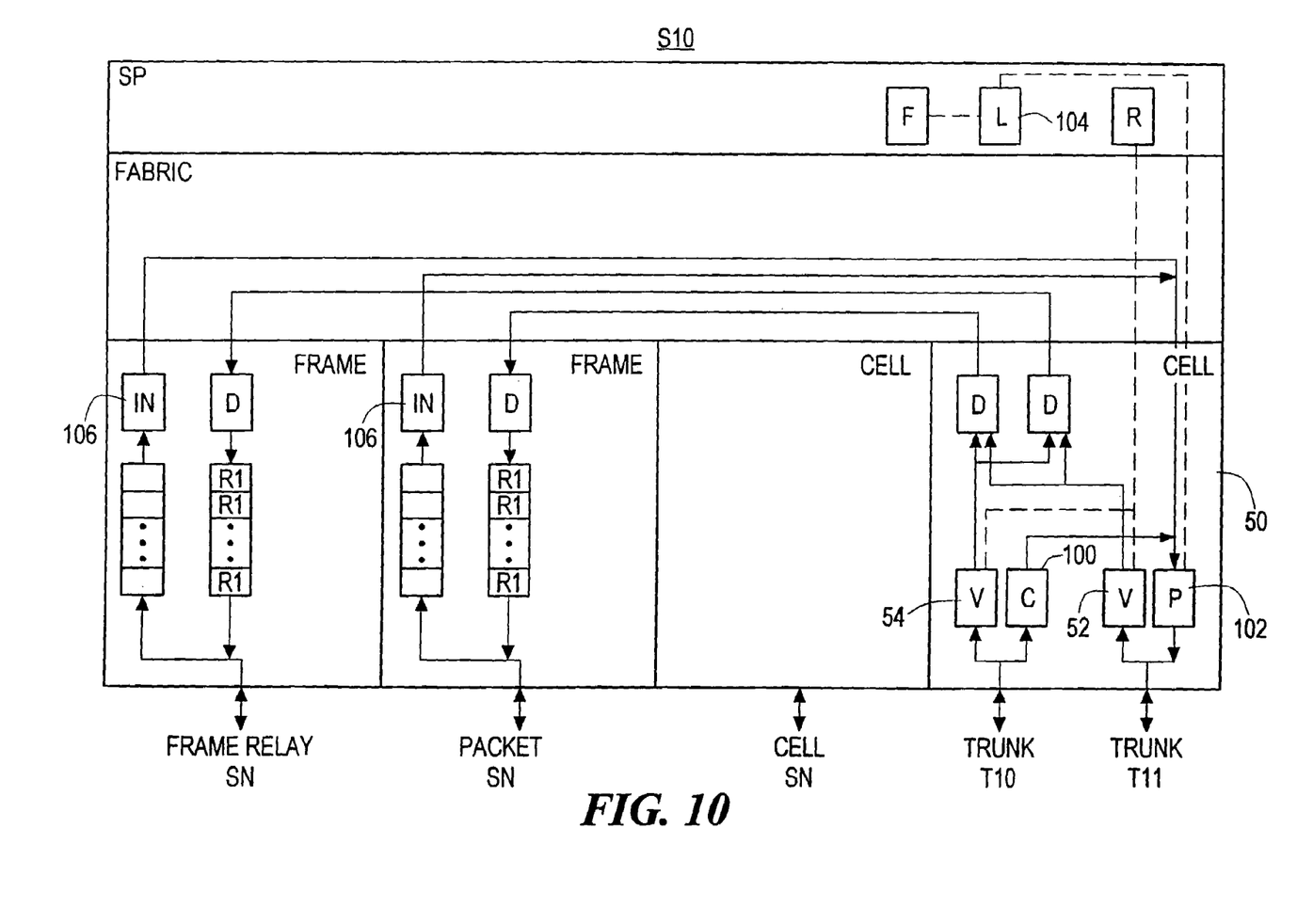
FIGS. 10 through 13 are schematic diagrams depicting data structures and their relationships in the switches of FIG. 1 after both the first and second MPTs have been established.
Figure 11:
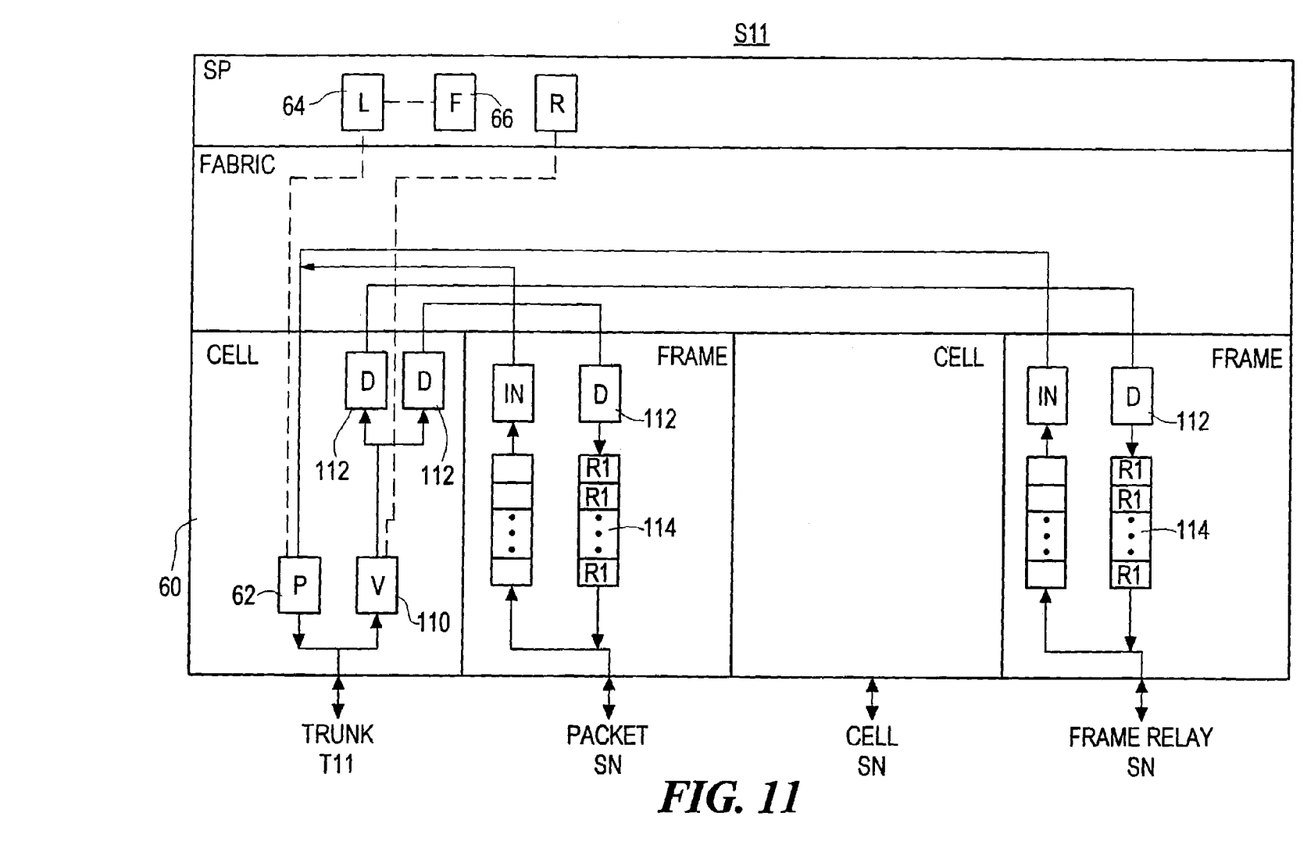
Figure 12:
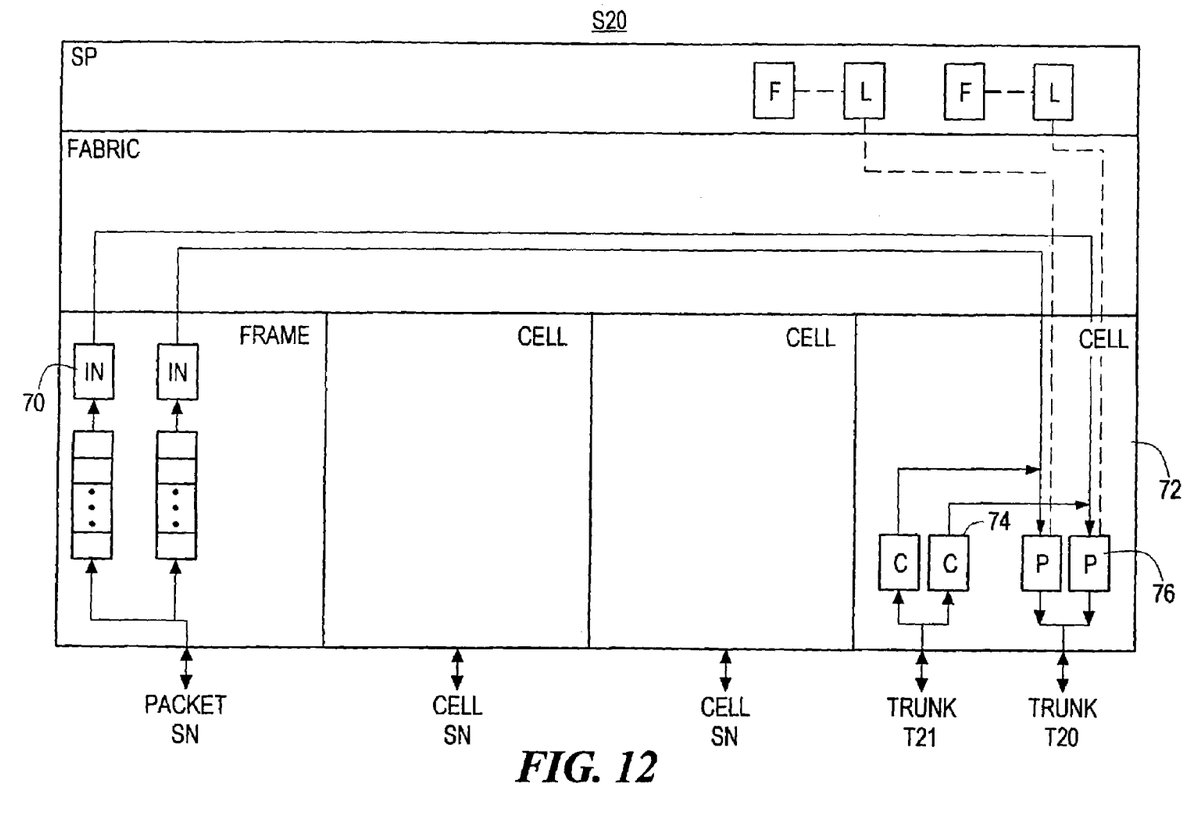
Figure 13:
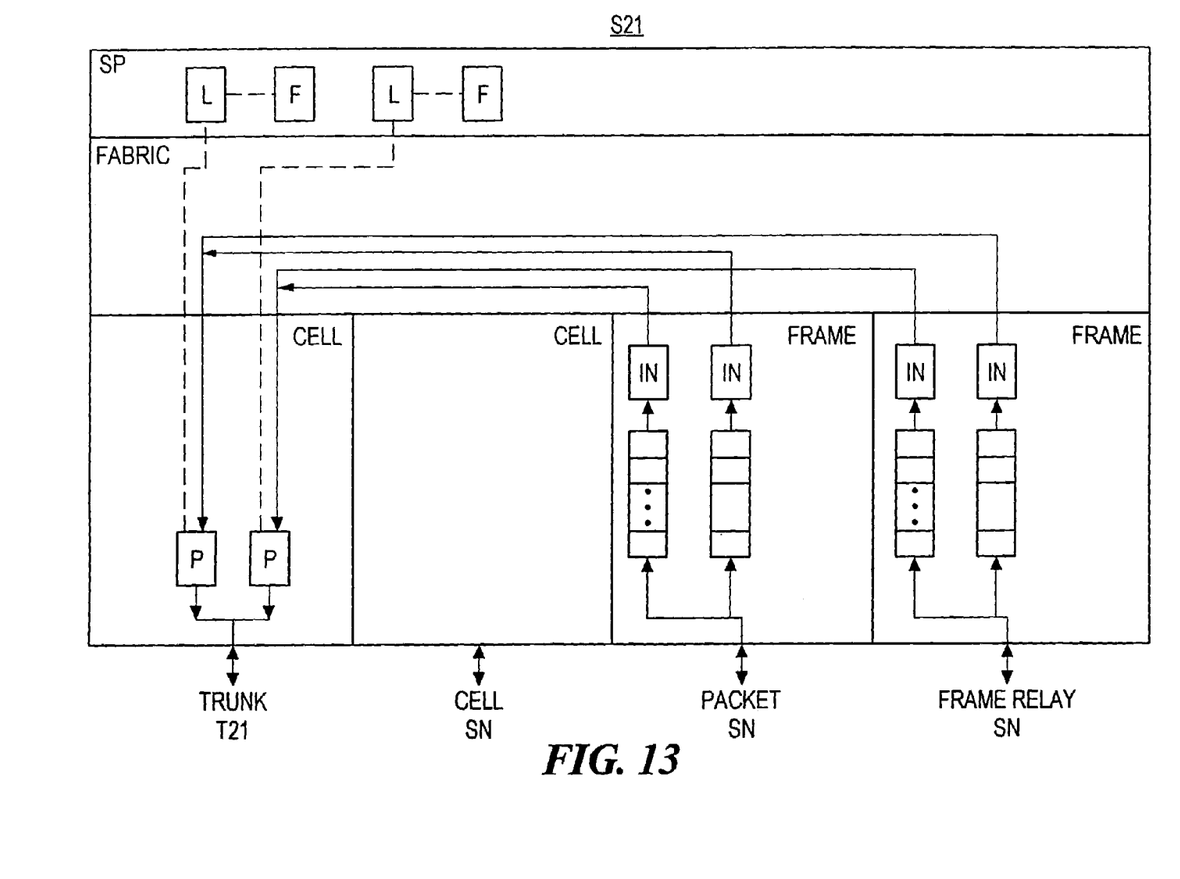

FIG. 9 illustrates a second MPT (MPT(2)), established by switch S11 as the root switch. The processing by S11 to establish MPT(2) is like that described above for switch S10. In this case, switch S11 first establishes switch S10 as a leaf first, then establishes switch S20 via switch S10, and finally establishes switch S21 via switches S10 and S20. Unlike the process used by switch S10, however, S11 is not constrained to use pre-provisioned PVPs or the VPCI signalling technique described above, because its single trunk connection T11 is direct rather than through the core network 10.

During the establishment of MPT(2), switch S10 plays the role of leaf and relay switch rather than root. Switch S10 behaves slightly differently as a relay than does switch S20, because in this case the downstream trunk for switch S10 is a PVP trunk, whereas for switch S20 the MPT(1) downstream trunk is the direct trunk T21. When the Child VC Entry (C) 100 is created on switch S10, the VPI allocated is one in the range of VPIs pre-provisioned for use by switch S10 on PVP Trunk 20, and a corresponding VPCI is calculated and signalled to switch S20 in the same manner described above for MPT(1). This need to enable a switch connected to the core network 10 to act as a relay for upstream switches is in fact the purpose for pre-provisioning a range of VPIs at an access point of the core network 10; it guarantees that at least some pre-determined number of VPIs will be available for use by switches upstream of switch S10 to establish their MPTs.

FIGS. 10 through 13 respectively show the results at each switch S11, S10, S20, and S21 after MPT(2) is established. It can be seen that switch S11 as root acquires a VP Termination VC Entry (V) 110, default connections (D) 112, and Reassembly Identifier VC Entries (RI) 114. Switch S10 acquires a Parent VC Entry (P) 102 at trunk T11, the Child VC Entry 100 at trunk T10, a Leaf VC Entry (L) 104, and two InCircuit structures (IN) 106. Switches S20 and S21 acquire another set of VC Entries exactly like those for MPT(1).

In the four-switch system shown in FIGS. 1, 4, and 9, two additional MPTs would also be established, one each for switches S20 and S21. These have been omitted for simplicity of description. These additional MPTs would be established in the same manner as described above for switches S10 and S11.

The MPTs existing on the direct trunks T11 and T21 are unidirectional connections, that is, each VPI used on either trunk is associated with a single MPT, and therefore with data flow in only one direction on the trunk. This features simplifies VPI allocation at direct trunks; VPIs are simply drawn from a pool at either end of a trunk without regard to VPI allocation at the other end. In the ATM core network 10, however, each PVP is bidirectional, that is, the VPI used for the PVP from access point 30 to access point 31 is also used for the PVP from access point 31 to access point 30. Thus switches S10 and S20 allocate VPIs on the PVP trunk 20 differently than on the direct trunks T11 and T21. Specifically, the switches S10 and S20 allocate a VPI that is already allocated to an MPT in the opposite direction, if any exist, before allocating any unused VPIS. While this complicates VPI allocation somewhat, it helps preserve VPI space in the ATM core network 10. To accomplish the allocation, the VC Entries (V, C) used at a trunk ingress store information indicating whether the trunk is a PVP trunk, and also whether the associated VPI is being used for an MPT in the egress direction.

An example of the above is given assuming that switch S20 establishes an MPT(3) after MPT(1) and MPT(2) have been established in the preceding manner. When switch S20 allocates a VPI at trunk T20, it allocates VPI 0 again, because VPI 0 was already allocated in the opposite direction. If switch S20 were not constrained to use such VPIs, it might have allocated, for example, VPI 5 to MPT(3) (assuming that VPIs are allocated sequentially and that VPIs 1–4 were already in use). Thus in such a case VPI 5 has been spared from non-essential use, leaving it available for allocation to another connection.

MPT Data Flow

Data cell transmission on an MPT involves a leaf switch as the source, a root switch as the destination, and possibly one or more intermediate or relay switches. The processing at these switches is described in turn.

At a leaf switch, one of the FEs on a frame card receives a frame at a port. The FE consults OSPF to determine which MPT to use to forward the frame. OSPF maintains a mapping from network addresses to InCircuit structures IN, which are provided to OSPF as they are created during the MPT setup processes described above. OSPF also maintains the network addresses of all the FEs in the system as assigned by a network manager. Thus the leaf switch determines the following from the destination address in the frame: (1) the MPT to send the data cells on to reach the destination (root) switch, and (2) the connection ID to be included with the data cells in order to reach the correct FE and Reassembly Identifier VC Entry RI on the destination switch.

The frame is then segmented into data cells, each one including in its header the VPI allocated to the MPT to be used, and a VCI including the 11-bit connection ID and the 5-bit FE identifier. These cells are then passed to the Parent VC Entry P associated with the VPI of the MPT, and sent to the next switch over the trunk at which the Parent VC Entry exists.

The switch at the other end of the trunk receives the incoming data cells, and determines its next action based on the type of VC Entry associated with the incoming VPI. If the VC Entry is a Child VC Entry C, the switch is a relay switch, and it thus switches the data cells to the outgoing trunk at the corresponding Parent VC Entry P, replacing the VPI with the VPI associated with the Parent VC Entry P. If the VC Entry associated with the incoming VPI is a VP Termination VC Entry V, the switch is a root switch. A root switch examines the FE ID field 36 of the VCI 33 to determine which Default connection D to forward the cells over. The destination FE uses the RE ID field 37 of the VCI 33 to index into a reassembly table on the frame card that points to the appropriate Reassembly Identifier VC Entry RI to reassemble the cells on. The FE accumulates data cells on this Reassembly Identifier VC Entry RI until a complete frame has been received, at which time the forwarding logic on the frame card forwards the frame to one of the card's ports as indicated by the destination address.

An MPT tunneling protocol has been described using virtual path merging and other techniques to conserve VPI space in an ATM core network. The techniques used are applicable more generally to the management of connection identifier space in connection-oriented networks. Additionally, several of the specific features of the illustrated embodiment may be achieved by other means without departing from the present invention. For example, the trunks connected to a given switch may be connected to different Cell cards, rather than to the same card as shown. The MPTs need not be established in the order given, nor is it necessary for an intermediate switch to have been established as a leaf before a switch downstream of the intermediate switch becomes a leaf.

It will be apparent to those skilled in the art that modifications to and variations of the above-described methods and apparatus are possible without departing from the inventive concepts disclosed herein. Accordingly, the invention should be viewed as limited solely by the scope and spirit of the appended claims.

What is claimed is:

1. In an intermediate switch having a downstream trunk connected thereto via which other downstream switches are reachable, an upstream trunk connected thereto via which the intermediate switch can be reached by other upstream switches and a pre-provisioned set of virtual path identifiers exclusively available for use with connections on the downstream trunk between the downstream switches and either the intermediate switch or the upstream switches, a method of establishing a new connection between a target downstream switch and an upstream switch comprising the steps of:

receiving a connection-establishment message from the upstream switch over the upstream trunk;

determining whether one of the downstream switches is the target of the received connection-establishment message; and     if one of the downstream switches is determined to be the target of the received connection-establishment message, performing the steps of:

determining whether a connection to any of the downstream switches over which the intermediate switch is to receive data cells destined for the upstream switch already exists on the downstream trunk, such a connection being identified by a corresponding one of the pre-provisioned virtual path identifiers other than any of the pre-provisioned virtual path identifiers allocated for connection between the target downstream switch and the intermediate switch;

if such a connection is determined to exist, sending a connection-establishment message over the downstream trunk, the message being addressed to the target switch and signaling a virtual path identifier previously allocated for use with the existing connection; and if no such connection is determined to exist, performing the steps of:

allocating one of the pre-provisioned virtual path identifiers, other than any of the pre-provisioned virtual path identifiers allocated for connection between the target downstream switch and the intermediate switch, for use with a new connection over which the intermediate switch is to receive data cells from the downstream switches destined for the upstream switch; and sending a connection-establishment message, the connection-establishment message being addressed to the target switch and signaling the allocated virtual path identifier.

2. A method according to claim 1, further comprising the step of informing a network routing program of the existence of the new connection upon establishment thereof.

3. A method according to claim 1, wherein each virtual path identifier in the pre-provisioned set of virtual path identifiers identifies a bidirectional connection on the downstream trunk, such that each virtual path identifier in the set is available for allocation to both an incoming connection over which the intermediate switch receives data cells from downstream switches and to an outgoing connection over which the intermediate switch sends data cells to downstream switches, and wherein the allocating step comprises the step of allocating a virtual path identifier previously allocated to an outgoing connection, if any, before allocating a virtual path identifier not previously allocated to an outgoing connection.

4. A method according to claim 1, wherein the signaled virtual path identifier is a selected one from a set of virtual path identifiers each of which identifies a bidirectional connection on the trunk, such that each virtual path identifier in the set is available for allocation to both an incoming connection over which the switch receives data cells from the other switches as well as to an outgoing connection over which the switch sends data cells to the other switches, and wherein the allocating step comprises the step of allocating a virtual path identifier previously allocated to an outgoing connection, if any, before allocating a virtual path identifier not previously allocated to an outgoing connection.

5. In a switch having a trunk connected thereto via which other switches are reachable, the switch including a set of virtual path identifiers each of which identifies a bidirectional connection on the trunk, such that each virtual path identifier in the set is available for allocation to both an incoming connection over which the switch receives data cells from the other switches as well as to an outgoing connection over which the switch sends data cells to the other switches, a method of establishing a new incoming connection to a target one of the other switches to receive data cells therefrom, the method comprising the steps of:

determining whether one of the virtual path identifiers in the set is allocated to an outgoing connection but not allocated to an incoming connection;

if a virtual path identifier in the set is determined to be so allocated, then allocating the virtual path identifier for use with the new incoming connection;

if none of the virtual path identifiers in the set is determined to be so allocated, then allocating a virtual path identifier in the set not allocated to either an incoming or outgoing connection for use with the new incoming connection; and sending a connection-establishment message over the trunk, the message being addressed to the target switch and signaling the virtual path identifier allocated for use with the new incoming connection.

6. A method according to claim 5, further comprising the step of determining, prior to allocating a virtual path identifier, whether a connection to any of the other switches over which data cells are to be received therefrom already exists on the downstream trunk, and wherein the allocating steps are performed only if such a connection is determined not to already exist.

* * * * *